(12) United States Patent
Heimann et al.

(10) Patent No.: US 7,827,684 B2
(45) Date of Patent: Nov. 9, 2010

(54) PROCESS FOR FINISH-MACHINING CRANK SHAFTS FOR MOTOR CAR ENGINES

(75) Inventors: Alfred Heimann, Aachen (DE); Reinhard Klomp, Mönchengladbach (DE); Peter Reim, Cremlingen (DE)

(73) Assignee: Hegenscheidt-MFD GmbH & Co. KG, Erkelenz (DE)

( * ) Notice: Subject to any disclaimer, the term of this patent is extended or adjusted under 35 U.S.C. 154(b) by 1226 days.

(21) Appl. No.: 10/521,144

(22) PCT Filed: Aug. 2, 2003

(86) PCT No.: PCT/EP03/08575
§ 371 (c)(1),
(2), (4) Date: Sep. 6, 2005

(87) PCT Pub. No.: WO2004/014600
PCT Pub. Date: Feb. 19, 2004

(65) Prior Publication Data
US 2006/0150405 A1 Jul. 13, 2006

(30) Foreign Application Priority Data
Aug. 6, 2002 (DE) .................... 102 35 957

(51) Int. Cl.
*B23P 17/00* (2006.01)
(52) U.S. Cl. .................. 29/888.08; 29/888.01; 72/10.1; 72/31.07; 72/83; 72/110
(58) Field of Classification Search ............. 29/888.01, 29/888.08; 72/10.1, 31.07, 83, 110
See application file for complete search history.

(56) References Cited

U.S. PATENT DOCUMENTS

| | | | | |
|---|---|---|---|---|
| 4,494,280 A | * | 1/1985 | Blaimschein | 29/888.08 |
| 5,009,001 A | | 4/1991 | Deschler | |
| 5,408,745 A | | 4/1995 | Tomiyama et al. | |
| 6,393,885 B1 | * | 5/2002 | Cadena | 72/110 |

FOREIGN PATENT DOCUMENTS

| | | |
|---|---|---|
| DE | 39 39 935 A | 6/1991 |
| DE | 199 19 893 A | 11/2000 |
| DE | 198 33 363 A | 1/2002 |
| EP | 1 052 049 A | 11/2000 |
| EP | 1 211 026 A | 6/2002 |
| JP | 63 068325 | 8/1988 |

OTHER PUBLICATIONS

International Search Report for PCT/EP03/008575 (in English and German).
International Preliminary Examination Report for PCT/EP03/008575 (in German).

* cited by examiner

*Primary Examiner*—Rick K Chang
(74) *Attorney, Agent, or Firm*—Proskauer Rose LLP

(57) ABSTRACT

The invention relates to a process for finish-machining of bearing positions on main bearing journals and connecting rod bearing journals of crankshafts for motor car engines, whereby the crankshafts have roundings between the bearing positions and transitions adjacent in each case to the bearing positions. The roundings are deep rolled with a deep rolling tool and then, while maintaining a distance interval to an individual transition in each case the bearing position concerned is machined with removal of material with a small cutting depth.

12 Claims, 2 Drawing Sheets

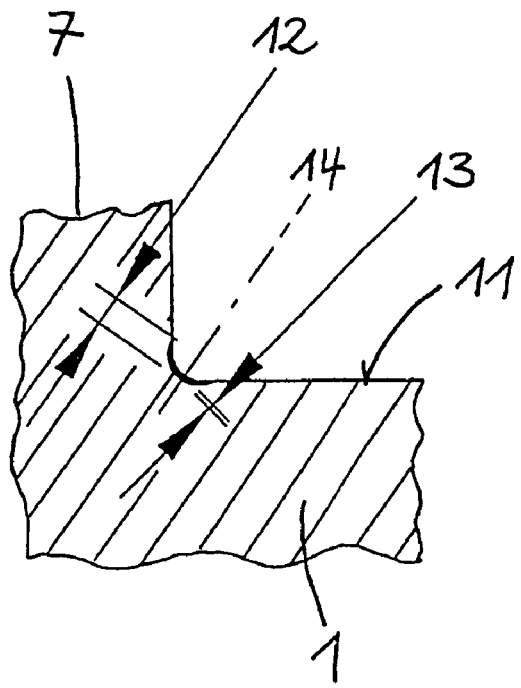
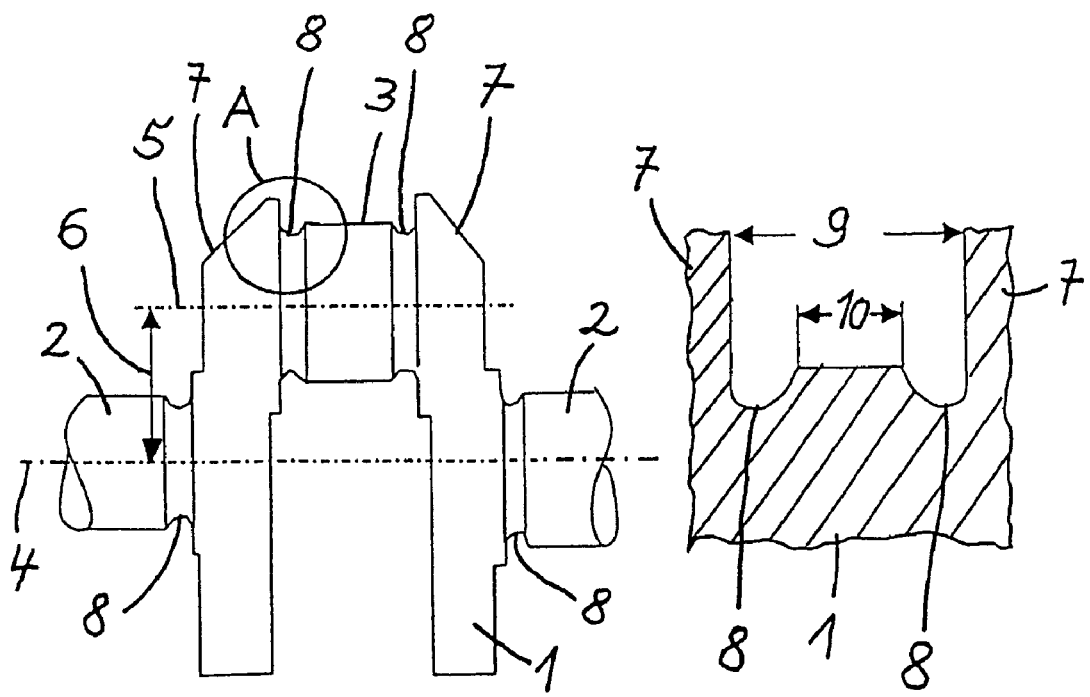
Fig. 3
Fig. 1
Fig. 2

PROCESS FOR FINISH-MACHINING CRANK SHAFTS FOR MOTOR CAR ENGINES

This application is a National Phase Application of International Application No. PCT/EP2003/08575, filed on Aug. 2, 2003, which claims the benefit of and priority to German patent application no. DE 102 35 957.1-14, filed Aug. 6, 2002. The disclosure of the above applications are incorporated herein by reference in their entirety.

BACKGROUND OF THE INVENTION

The invention relates to a process for the finish-machining of the bearing positions on main bearing journals and connecting rod bearing journals of crankshafts for motor car engines, whereby the crankshafts have roundings between the bearing positions and the transitions adjacent in each case to the bearing positions, such as for example cheeks or adapting bearings.

To increase the fatigue strength of the crankshaft of engines for motor vehicles, the transitions at the bearing positions of the main bearing journals and connecting rod bearing journals are deep rolled. In this situation, deep rolling rollers, which have a diameter of some 15 mm and a rounding radius of some 1.3 mm, are pressed with defined force into the radii or recesses which delimit the individual bearing position of the main bearing journals or connecting rod bearing journals on both sides. As a result of the pressing of the hard deep rolling rollers, plastic deformation occurs between the transition, such as for example the cheek or the adapting bearing of the crankshaft, and the bearing position, and in this way induces a state of pressure internal stresses into the crankshaft, which increases the fatigue strength of the crankshaft. In this situation, a part of the width of the bearing position is required for the deep rolling. From a theoretical maximum available width between two adjacent transitions and the bearing position of a main bearing journal or a connecting rod bearing journal relating to them there is accordingly only a reduced width available as a contact area for the connecting rod or the main bearing. As a result of the higher degree of exploitation of engines, and of diesel engines in particular, there is a desire to be able to make use of the largest possible width of the bearing position at the main bearing journal and connecting rod bearing journal. It is true that the usable bearing width increases as the rounding radius of the deep rolling roller decreases, but at the same time the fatigue strength of the crankshaft attainable with deep rolling is reduced.

In particular, recesses or fillets increase the level of tension on crankshafts under flexural and torsion stress, because at the same time they weaken the diameter at the transition to the cheek. This applies equally to main bearings and stroke bearings, so that, as a result of the recesses, the stress at the transition to the cheek is further increased.

From DE 198 33 363 A1 a "method for the lathe machining of rotation surfaces on workpieces, preferably on crankshafts, and a disk-shaped tool for carrying out the method" is known. For the lathe machining of crankshafts provision is made for a disk-shaped tool, which consists of a centering body, a carrier body, and several tool units for dressing the free recesses on the main bearing journals and connecting rod bearing journals, as well as other tool units for dressing the actual bearing positions on the main bearing journals and connecting rod bearing journals, located between the free recesses. In this situation, the free recesses are dressed by several tool units, each of which contains a dress-machining cutting insert. By contrast with the preliminary machining of the bearing positions by roughing, in this situation the fine machining of the recesses and bearing positions is carried out in a known manner by dressing. Accordingly, a good surface quality and low peak-to-valley roughness is achieved at the machining positions, as a result of which the fatigue strength of the crankshaft is increased.

A method, tool, and device for material-removing machining of crankshafts are further known from European Patent Application EP 1 052 049 A2. According to this, it can be advantageous in mechanical engineering terms if, during the manufacture of crankshafts, the bearing zones are in each case milled in the first machining step, after which, in the second machining step in each case the rotational movement of the tool ends in a predetermined position, and in this position the roundings or fillets of the bearing journals arranged on both sides of the bearing surface are lathe-machined or turned. Accordingly, the edges which are required for technical application reasons on dynamically highly-stressed parts are rounded or prepared with fillets, which then lead to an increase in the fatigue strength of the crankshaft.

SUMMARY OF THE INVENTION

The object of the present invention is to obtain bearing positions of the greatest possible width on a crankshaft and, in this situation, at the same time to increase their fatigue strength by a perceptible degree.

This object is achieved by fine machining the crankshaft. In this situation, in the most favourable case this involves a crankshaft which already has low tolerance values in its preliminary machining, for example by casting, forging, and subsequent hardening.

In accordance with the invention, however, crankshafts can also be finish-machined which have already been subjected to material-removing machining, such as for example by milling, and are then intended to undergo fine machining. In this situation, such crankshafts can also be hardened even after roughing.

To achieve the object, provision is made for the roundings between the bearing positions and the transitions adjacent to the bearing positions in each case, such as for example the cheeks or adapting bearings, to be deep rolled with a deep rolling tool, and then, maintaining a distance interval to the individual transition in each case, for the bearing position concerned to be machined with removal of material with a small cutting depth.

In this way, only a little of the favourable pressure internal stress course caused by the deep rolling will be removed in the fillet, so that the pressure internal stress state of the crankshaft is largely retained. Also, in this way, bearing positions can be created which are broader than usual. This is possible in that the grinding disk or the tool with which the bearing position is fine-machined does not come in contact with the radius in the transition between the bearing position and the adjacent cheek, but material is only removed at the edge of the rolling in area thrown up by the deep rolling. As a consequence of this, the removal of material during the finish-machining of the bearing positions can be kept low, and amounts to only between 0.1 to 0.3 mm. The method is therefore particularly well-suited for the fine-machining of crankshafts hardened on the running surfaces of the bearings, whereby the penetration depth of the hardening can be small because of the small amount of material removed.

The rolling-in depth of the roundings is derived from the increase in fatigue strength which is required. In most cases it amounts to 0.2 mm. In comparison with deep rolled recesses, the rolling-in depth of the roundings can be lower.

The material removing finish-machining of the bearing position can be carried out either with unspecified cutting edge, for example by grinding, or with specific cutting edge, such as by milling, turning, broaching, turn-broaching, or turn-turn-broaching.

Finally, the distance interval on both sides between the transitions and the individual bearing position is determined by the width of the fine-machining tool. This amounts to between 0.5 and 5 mm, preferably 1 mm.

The crankshaft produced in this way is characterised by tangent radii between the individual bearing positions and their transitions.

BRIEF DESCRIPTION OF THE DRAWINGS

The invention is described hereinafter on the basis of an embodiment.

It is shown in:

FIG. 1: A section of a crankshaft on a reduced scale,

FIG. 2: A section from a bearing journal of a crankshaft according to FIG. 1,

FIG. 3: An enlarged section A from a transition area of a crankshaft, and

DETAILED DESCRIPTION OF THE INVENTION

Figure 4:
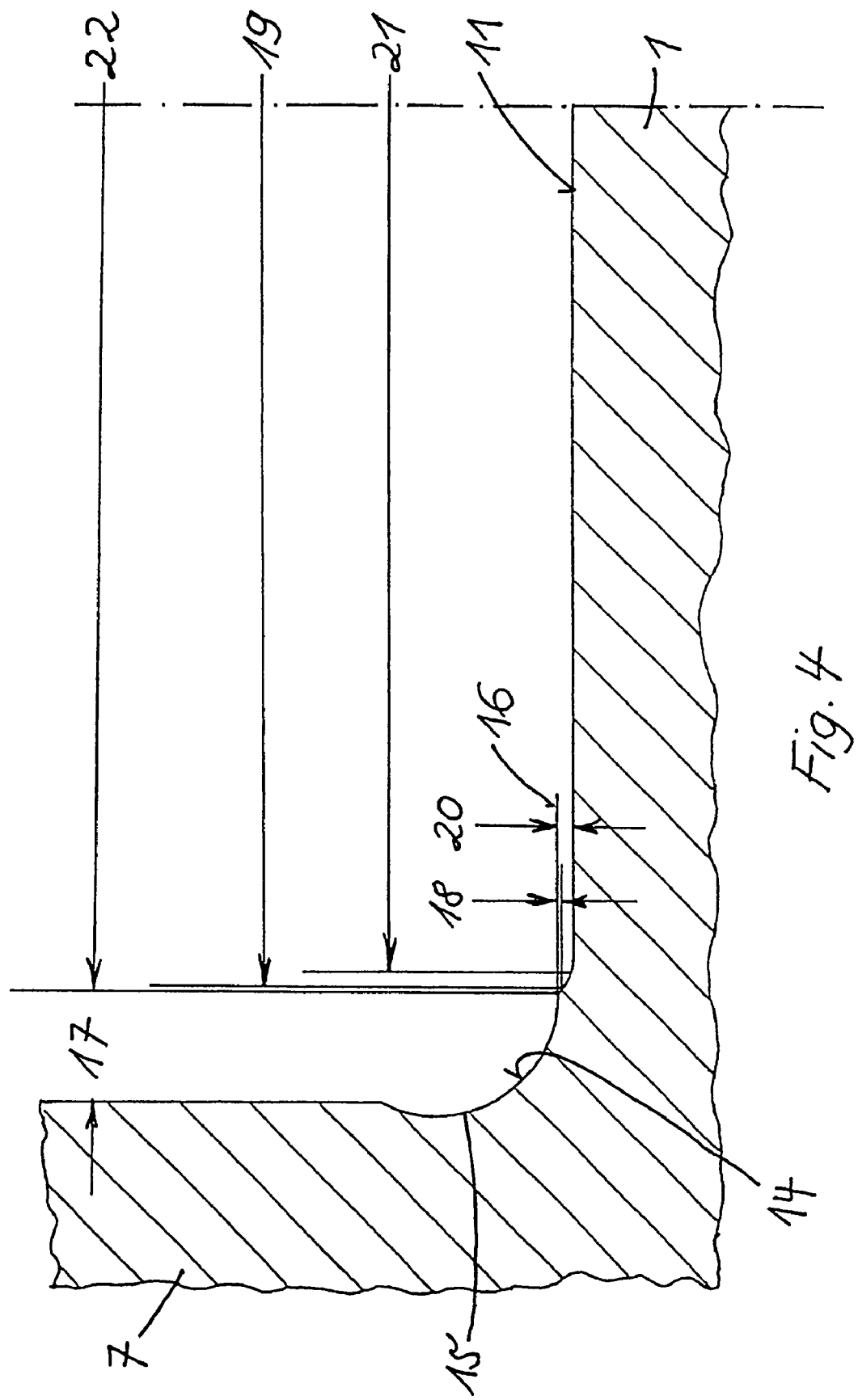
FIG. 4: An enlarged section from the transition area of FIG. 3 of a crankshaft.

The crankshaft 1 has two main bearing journals 2 and a stroke bearing journal 3. The crankshaft 1 is mounted in the engine block (not shown) of a motor car engine so as to rotate about the axis of rotation 4 with the two main bearing journals 2. The axis of rotation 5 of the stroke bearing journal 3 is at a distance 6 from the axis of rotation 4 of the crankshaft 1, this distance corresponding to the stroke. The transitions between the two main bearing journals 2 and the stroke bearing journal 3 are formed by the two cheeks 7. Between the main bearing journals 2, the stroke bearing journal 3, and the individual transitions 7, provision is made in each case for fillets 8. The largest theoretically available bearing width 9 is reduced by the two fillets 8 to the actually available bearing width 10, as can be seen in FIG. 2.

In accordance with the invention, the bearing position 11, which pertains to a main bearing journal 2 or a stroke bearing journal 3, is deep rolled with the aid of a deep rolling roller (not shown). The rounding radius 12 of the deep rolling roller should amount to some 1.2 mm. It is deep rolled to a rolling-in depth 13 of about 0.2 mm. Before the deep rolling, the bearing position 11 can undergo preparatory material-removing machining, whether by milling, turning, or broaching, and can then also be hardened.

FIG. 4 shows the half-width of a bearing position 11. The bearing position 11 is deep rolled in the transition area 14 on both sides of the bearing position 11. In this situation, what are referred to as "tangent radii" 15 are formed. The surface 16 of the bearing position 11 is then finish-machined by grinding with a grinding disk (not shown). In this situation, the grinding disk maintains a distance interval 17 from the two transitions 7. For example, with the removal of the surface 16 with the aid of the grinding disk at a depth 18 of 0.1 mm, a bearing width 19 of the bearing position 11 is obtained. With removal at a depth 20 of 0.3 mm, by contrast, only a usable bearing width 21 is obtained, which is less than the usable bearing width 19 which was obtained with a grinding removal of lesser depth 18. In this situation it is a tacit precondition that the grinding disk with which the bearing position 11 was machined has at its edges in each case an equally large rounding radius in the order of size of 0.5 mm.

A theoretically maximum obtainable width 22 of the bearing position 11 cannot be obtained, however, as long as it is intended that, during the finish-machining of the main bearing journal 2 or connecting rod bearing journal 3, in each case a removal of material 18 or 20 from the bearing position 11 should take place. Instead of machining with a grinding disk, however, the bearing position 11 can also be machined with a milling machine or a broaching tool with smaller cutting depth.

In comparison with conventional inherently-known machining of the bearing journals 2 or 3 of crankshafts 1, as represented in FIG. 2, substantially larger bearing widths 19 and 21 respectively are attained by the present method, whereby at the same time the fatigue strength of the crankshaft 1 is increased by the effective cross-section of the main bearing journal 2 or connecting rod bearing journal 3 not being further weakened by fillets 8.

REFERENCE NUMBER LIST

1 Crankshaft
2 Main bearing journal
3 Stroke bearing journal
4 Axis of rotation
5 Axis of rotation
6 Stroke
7 Transition, cheek
8 Fillet
9 Theoretical bearing width
10 Practical bearing width
11 Bearing position
12 Radius of deep rolling roller
13 Rolling-in depth
14 Transition area
15 Tangent radius
16 Surface of bearing position
17 Distance interval
18 Grinding depth
19 Usable bearing width
20 Grinding depth
21 Usable bearing width
22 Theoretically usable bearing width

The invention claimed is:

1. Process for finishing-machining of bearing positions on main bearing journals and connecting rod bearing journals of crankshafts for motor car engines, whereby the crankshafts have roundings between the bearing positions and transitions adjacent in each case to the bearing positions, the process comprising:

deep rolling the roundings with a deep rolling tool; while maintaining a distance interval to an individual transition in each case, machining the bearing position concerned by removal of material with a small cutting depth.

2. Process according to claim 1, wherein a rolling-in depth at the deep rolling of the roundings is between 0.1 and 0.5 mm.

3. Process according to claim 2, wherein the rolling-in depth at the deep rolling of the roundings is 0.2 mm.

4. Process according to claim 1, wherein the small cutting depth during the machining of the bearing position concerned by removal of material amounts to between 0.1 and 0.5 mm.

5. Process according to claim 4,
wherein machining by removal of material is carried out with unspecified cutting edge by grinding.

6. Process according to claim 5,
wherein machining by removal of material is carried out with a grinding wheel which has an edge radius of up to 1 mm.

7. Process according to claim 6,
wherein machining is carried out with a grinding wheel which has an edge radius of 0.5 mm.

8. Process according to claim 4,
wherein machining by removal of material is carried out with specific cutting edge by milling, turning, broaching, turn-broaching, or turn-turn-broaching.

9. Process according to claim 4,
wherein the small cutting depth during the machining of the bearing position concerned by removal of material amounts to 0.25 mm.

10. Process according to claim 1,
wherein the transitions adjacent in each case to the bearing positions are cheeks of adapting bearings.

11. Process according to claim 10,
wherein a distance interval between the cheek and the bearing position in each case is between 0.5 and 5 mm.

12. Process according to claim 11,
wherein the distance interval between the cheek and the bearing position in each case is 1 mm.

* * * * *